United States Patent [19]
Hatteland et al.

[11] Patent Number: 5,351,218
[45] Date of Patent: Sep. 27, 1994

[54] METHOD FOR RECONNECTION AND CONNECTION OF SENSOR GROUPS

[75] Inventors: Kjell Hatteland, Royken; Jan-Åge Langeland, Garnes, both of Norway

[73] Assignee: Geco A.S., Stavanger, Norway

[21] Appl. No.: 90,243

[22] Filed: Jul. 7, 1993

Related U.S. Application Data

[63] Continuation of Ser. No. 825,608, Jan. 24, 1992, abandoned.

[30] Foreign Application Priority Data

Feb. 1, 1991 [NO] Norway .................. 910387

[51] Int. Cl.⁵ .................. G01V 1/38
[52] U.S. Cl. .................. 367/20; 367/21; 367/153; 367/154
[58] Field of Search .................. 367/20, 21, 76–80, 367/106, 122, 129, 130, 153, 154

[56] References Cited

U.S. PATENT DOCUMENTS 4,538,251  8/1985  Steetle .................. 367/154
5,058,080  10/1991  Siems et al. .................. 367/79

FOREIGN PATENT DOCUMENTS 161022  6/1989  Norway .
1230701  5/1971  United Kingdom .

*Primary Examiner*—J. Woodrow Eldred
*Attorney, Agent, or Firm*—Jacobson, Price, Holman & Stern

[57] ABSTRACT

A method for reconnection and connection of sensor groups, especially hydrophone groups or channels in a seismic cable, where the active sections in the seismic cable are connected with electronic modules or one another via connector plugs, is based on the principle that a specific number of hydrophone groups are connected symmetrically on each side of each electronic module. The number of connected hydrophone groups on each side is identical and constitutes at least one respective active section. A summation of a set of hydrophone groups in a section is performed automatically by connecting this section with another section or by connecting a respective section and the electronic module.

15 Claims, 5 Drawing Sheets

(PRESENT INVENTION, 6·25m GROUP LENGTH)

(PRIOR ART, 6.25m GROUP LENGTH)

(PRIOR ART, 12.5m GROUP LENGTH)

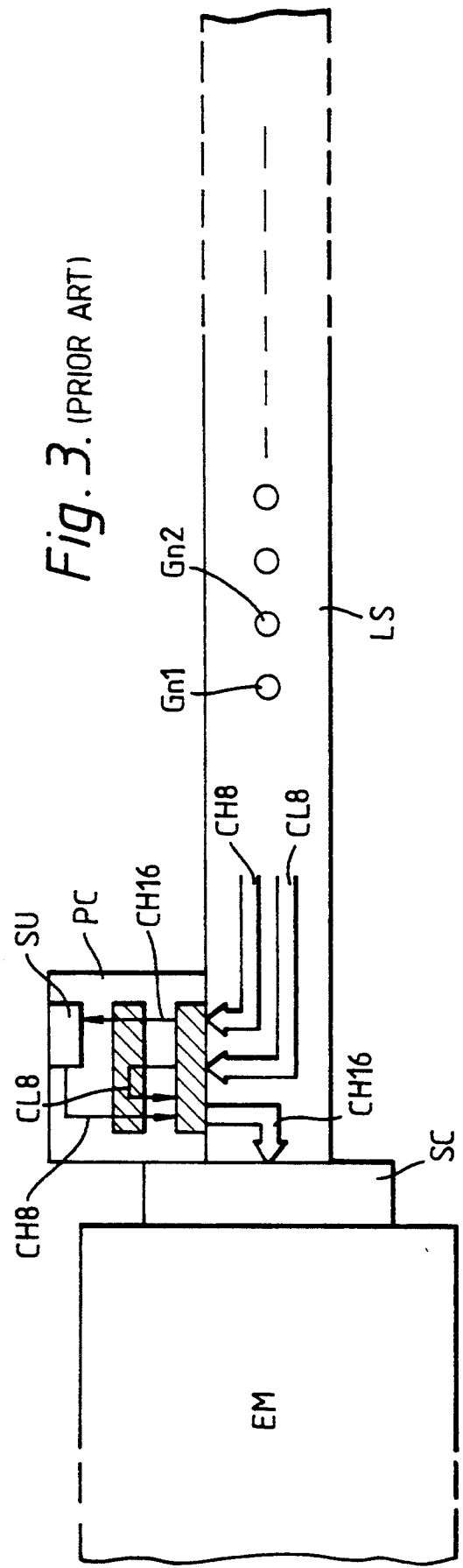
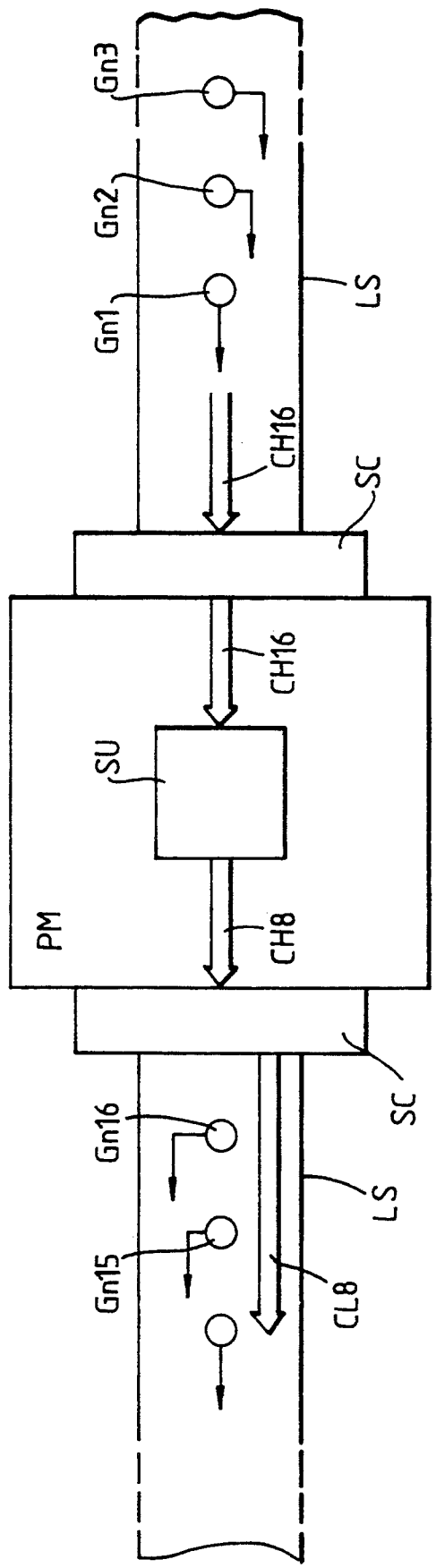
Fig. 3. (PRIOR ART)
Fig. 4. (PRIOR ART)

(PRESENT INVENTION, 6.25m GROUP LENGTH)

(PRESENT INVENTION, 12.5m GROUP LENGTH)

Fig. 7. (GROUP LENGTH 6·25 m)

METHOD FOR RECONNECTION AND CONNECTION OF SENSOR GROUPS

This is a continuation of application Ser. No. 07/825,608, filed Jan. 24, 1992 which was abandoned upon the filing hereof.

BACKGROUND OF THE INVENTION

The invention concerns a method for reconnection and connection of sensor groups, and more particularly hydrophone groups or channels in a seismic streamer where the active sections in the seismic streamer are connected with electronic modules or with one another via connector plugs.

In marine seismic surveys data acquisition is normally conducted by towing behind a vessel a so-called hydrophone cable or seismic streamer which is composed of a number of active sections containing hydrophone groups, the active sections usually being separated by passive sections. A typical seismic streamer may have a length of 3–4 km and the number of active sections may be, e.g., 48 or 96 or more. Each active section comprises a number of hydrophone groups, these groups varying in length from, e.g., a few meters up to 100 meters and comprising 20–100 hydrophones or more. The typical number of hydrophone groups or channels in a seismic streamer can therefore be approximately 1000.

The extent of the hydrophone groups and the distance between their centers affect the spatial resolution which can be achieved in a marine seismic survey. In order to obtain an optimum data recording, every effort is made to reduce to a minimum the number of channels used and thereby the amount of data which has to be stored for further processing, without any of the vital and required information on the subterranean structures being lost.

In accordance with prior art the active sections are built up to a typical length of 100 meters with specific group lengths of, e.g., 6.25 meters or 12.5 meters. The sections are connected via electronic modules, thus forming a seismic streamer several kilometers in length. The object of the electronic modules is to provide a digitalization and further transfer of the analog signals recorded by the hydrophone groups to the data recording system aboard the vessel which is towing the seismic streamer. In order to increase the group length, the hydrophone groups are connected together two by two in parallel by means of so-called program plugs or processor modules. It is also possible to connect more than two hydrophone groups together. The connected groups are summed, e.g., two by two in the program plugs or processor modules and the groups thus summed are then fed into the electronic module for further transfer to the data equipment on the towing vessel.

The disadvantage of connecting hydrophone groups in this manner is the use of extra connector plugs and program plugs which are exposed to sea water, thus resulting in an increased risk of water penetration leading to faults such as short circuiting of the connector plugs. This reduces the reliability of the marine seismic survey and will probably lead to interruptions of the survey which can be extremely expensive.

BRIEF SUMMARY OF THE INVENTION

The object of the present invention is therefore to provide a connection of the hydrophone groups without the use of program plugs, processor modules and possibly so-called summation adapters. This is achieved by the use of a symmetrical connection of the hydrophone groups around the electronic modules and, e.g., having the summation of the hydrophone groups or channels carried out in the actual connector plug. By means of the method in accordance with the present invention uniform connecting interfaces can thus be achieved over the entire seismic streamer with an optimum and possibly even distribution of the number of contact points for both the foremost and hindmost contacts, together with a more even weight distribution along the sections in the seismic streamer and finally a reduction in the number of leads in the streamer, thus reducing the total weight.

The above-mentioned and other objects are achieved by a method in accordance with the present invention, characterized in that a specific number of hydrophone groups are connected symmetrically on each side of the electronic module, so that the number of connected hydrophone groups on each side is identical and constitutes at least one respective active section and that a summation of one set of hydrophone groups in a section is performed automatically by connecting this section to another section or by connecting a respective section and the electronic module.

BRIEF DESCRIPTION OF THE DRAWINGS

The invention will now be explained in more detail in the following description with reference to the accompanying drawings wherein:

FIG. 3 illustrates schematically the principle of a program plug in accordance with prior art;

FIG. 4 illustrates schematically the principle of a processor module in accordance with prior art;

DETAILED DESCRIPTION

Figure 1:
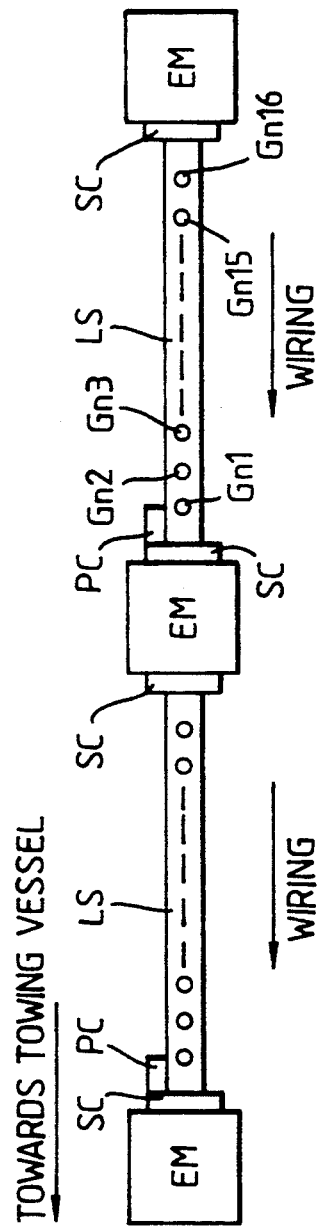
FIG. 1 is a schematic representation of a section of a seismic streamer connected in accordance with prior art.

FIG. 1 illustrates how active sections in the seismic streamer are connected to electronic modules supplied with connector plugs, each section at the front end being supplied with a program plug which sums two by two the total of 16 hydrophone groups or channels Gn1–Gn16 in each active section. Each hydrophone group has a group length of 6.25 meters, i.e. the active section is 100 meters long. Eight carrier lines from the hindmost sections are also connected via the program plug, thus giving a total of 16 channels on the program plug's output which are connected with the connector plug on the electronic module.

Figure 2:
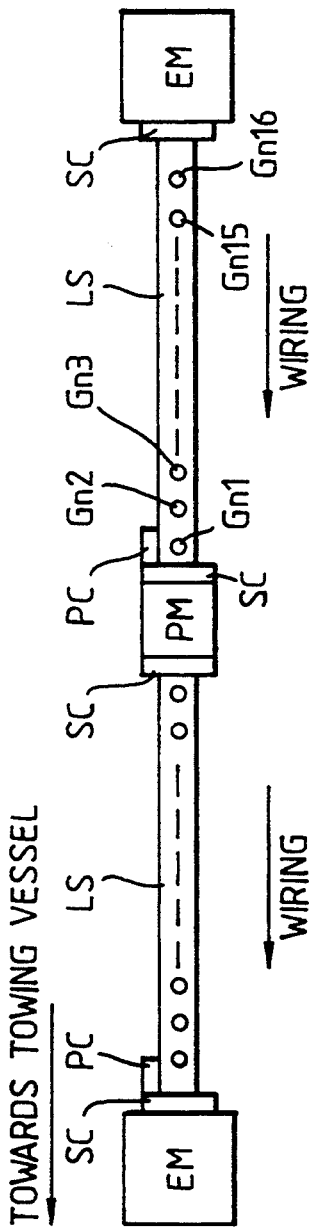
FIG. 2 is a schematic representation of a section of another embodiment of a seismic streamer in accordance with prior art.

The basic embodiment of a program plug in accordance with prior art is illustrated in more detail in FIG. 3. FIG. 2 shows a section of a seismic cable similar to that illustrated in FIG. 1, the only difference being that the groups are connected two by two, thus giving a group length of 12.5 meters in each 100 meter long active section. Two such 100 meter long sections are connected via a processor module by means of connector plugs.

The principle of the processor module in accordance with prior art and the connection of active sections as in FIG. 2 are illustrated in more detail in FIG. 4. In the processor module the 16 hydrophone groups or channels Gn1–Gn16 in the hindmost active section are connected two by two, giving eight hydrophone groups or channels with a group length of 12.5 meters. These are transferred via eight carrier lines through the next active section to the program plug on the electronic module at the front end, as shown in FIG. 1. Here the 16 channels Gn1–Gn16 are also transmitted from the foremost active section to the program plug and there summed two by two in order to be transmitted via the connector plug to the electronic module as eight channels or hydrophone groups corresponding to a group length of 12.5 meters as in the first active section.

In this known technique, therefore, a relatively large number of connector plugs, program plugs and processor modules are used in order to achieve a suitable connection and summation of the hydrophone groups in the active sections.

Figure 5:
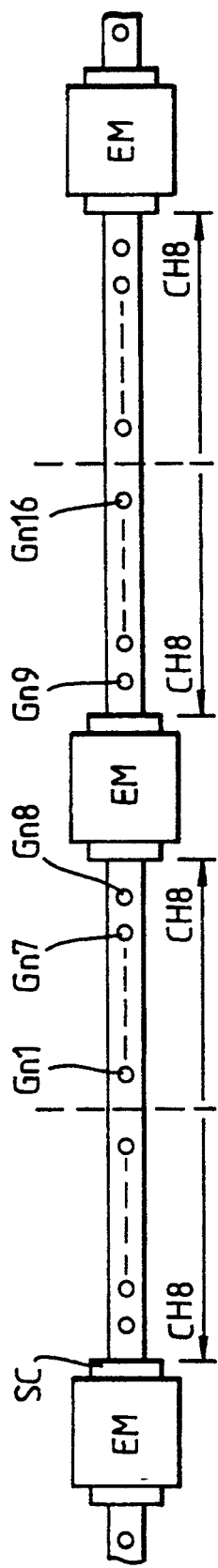
FIGS. 5 and 6 are schematic elevational views of seismic streamers connected by the method in accordance with the present invention.
Figure 6:
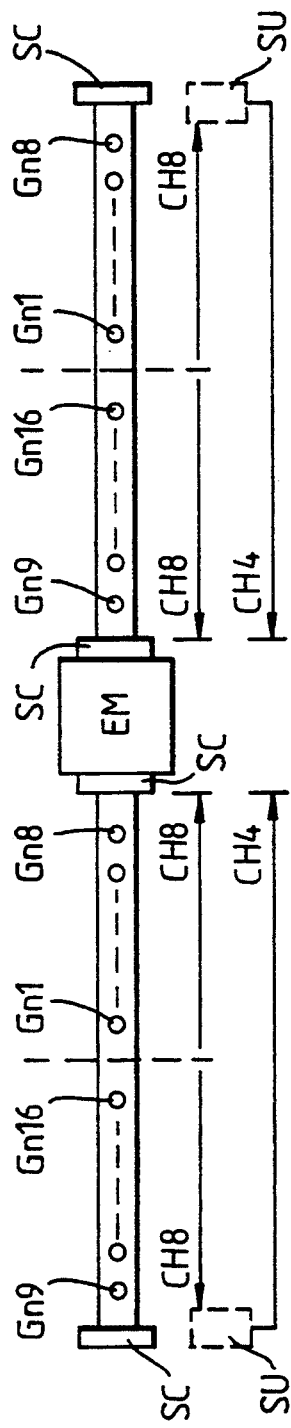

FIG. 5 illustrates the method in accordance with the present invention with the use of active sections with 16 hydrophone groups each, each with a length of 6.25 meters. Here eight hydrophone groups Gn9–Gn16 foremost or forward in a first active section forming a forward section are connected to an electronic module, while on the opposite side of the same electronic module the eight hindmost or rearward hydrophone groups Gn1–Gn8 in a subsequent or second active section forming a rearward section are connected to the same electronic module, so that a symmetrical connection of the same number of channels on each side of the electronic module is obtained via suitable connector plugs. The hydrophone groups in the remaining active sections i.e., the rearward section of the first active section and the forward section of the second active section, are connected to their respective electronic modules in a similar manner. An example of the use of 12.5 meter group length is illustrated in FIG. 6. Here two sixteen channel active sections are arranged between each electronic module, so that the active sections adjoining each electronic module, in this case 100 meter long active sections, are connected symmetrically around the electronic module via suitable connector plugs. The hydrophone groups in the active sections are also here summed two by two, giving a group length of 12.5 meters. As can be seen in FIG. 6, this is done by summing the eight channels furthest from the electronic module, e.g. Gn9–Gn16 as in the section on the left of the figure, via the connector plug which connects two adjoining sections, to four summed channels which are transmitted to the electronic module on four carrier lines via the connector plug fitted there. At the same time the eight channels closest to the electronic module, Gn1–Gn8 on the left of the electronic module, Gn9–Gn16 on the right of the electronic module, are transmitted to this via the same connector plugs, where the channels can be summed two by two in the connector plug or possibly also summed by means of an analog switching unit which is provided in the electronic module.

Figure 7:
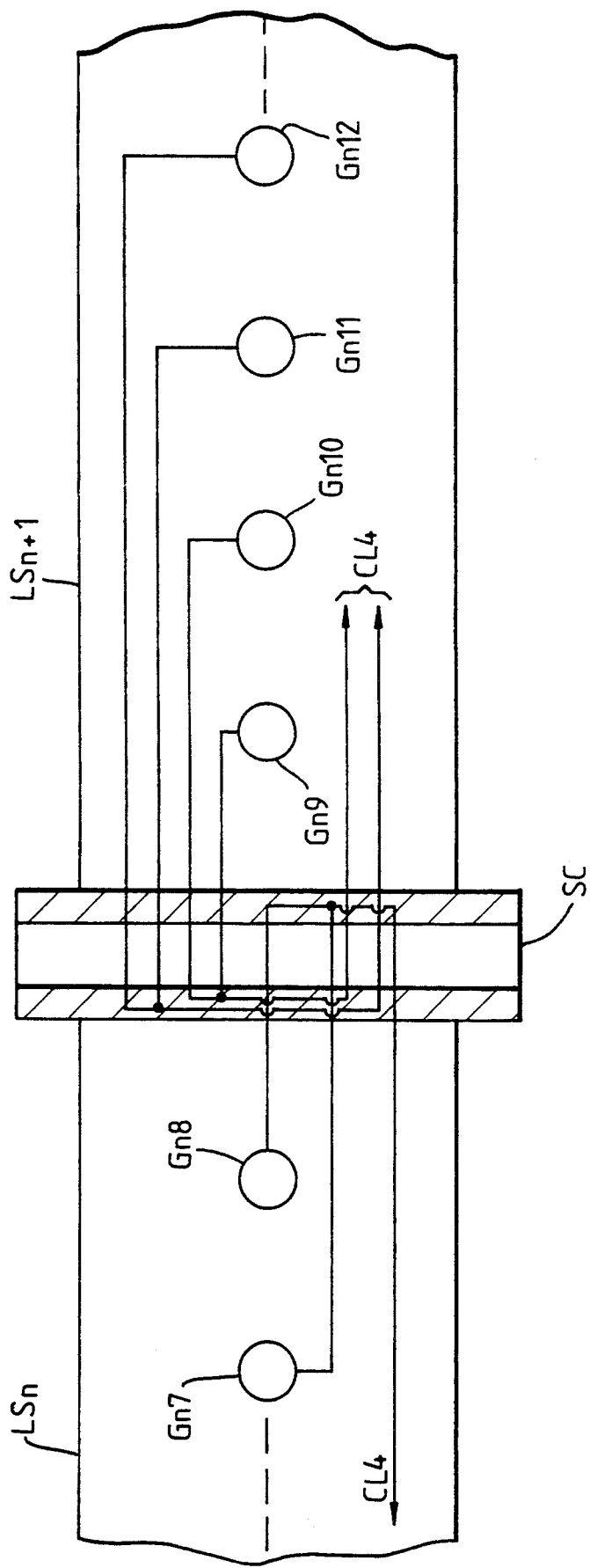
FIG. 7 is a partially cross-sectional view showing schematically the principle of automatic summation in a connector plug.

The principle of automatic summation in a connector, e.g. between two sections or in principle also in an electronic module is illustrated in more detail in FIG. 7. The connector plug between section n and section n+1 sums respectively eight single channels Gn1–Gn8 in section n to four summed channels or hydrophone groups which are further transmitted to the electronic module on four carrier lines, while similarly eight single groups Gn9–Gn16, e.g., in this case each 6.25 meters in length, are automatically summed in the same way to four hydrophone groups which are transmitted to the hindmost electronic module on four carrier lines.

Figure 8:
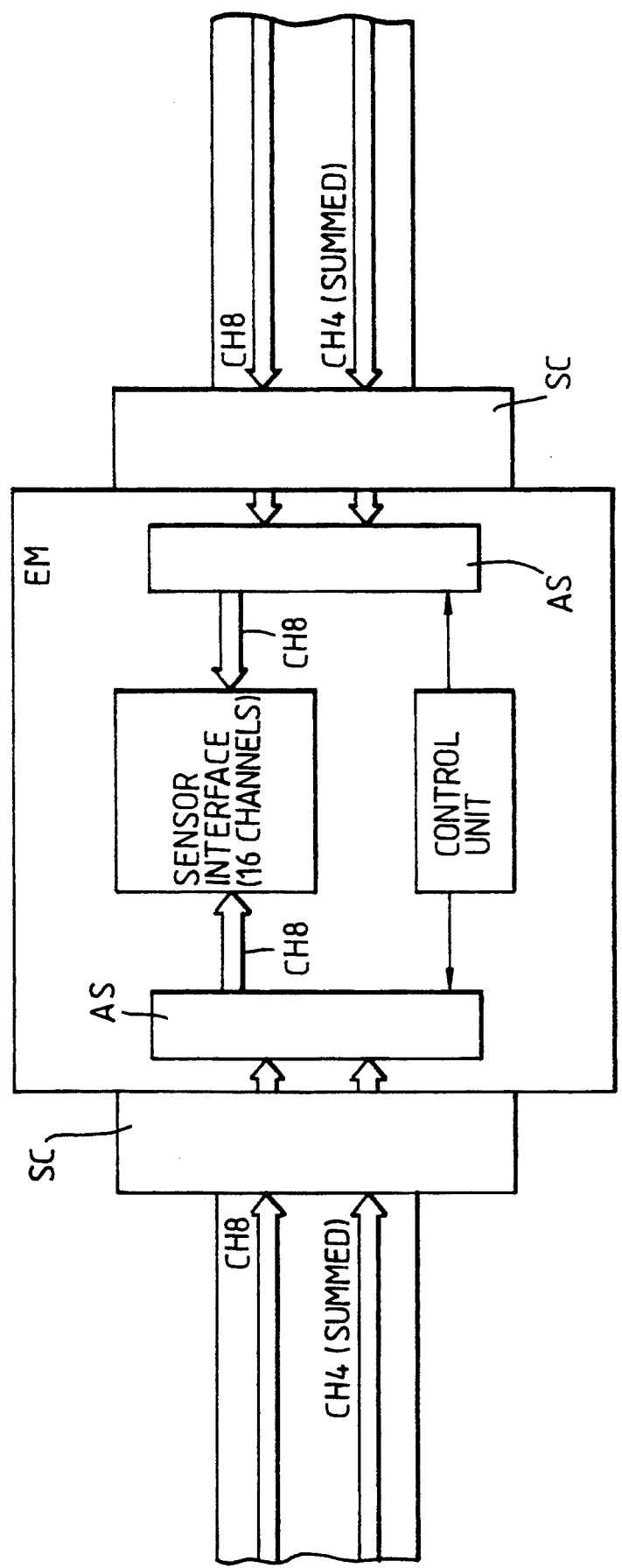
FIG. 8 is a diagram schematically illustrating the principle of summation in an electronic module.

In the embodiment in FIGS. 5 and 6 the summation of the closest eight channels on each side of the electronic module can be performed in analog switching units, as illustrated in FIG. 8. After a summation of the eight closest single channels two by two in the analog switching unit, a total of four summed channels are obtained at its output, leading to a 16 channel sensor interface, since the already summed eight single channels in the outermost part of the adjoining active section via the carrier lines are also connected to the sensor interface via the analog switching unit. The same arrangement is used in the hindmost active section with four summed channels and eight single channels, which after summation of the single channels are transmitted to the sensor interface which thus comprises a total of sixteen channels.

It is clear, therefore, that by using a double group length, viz. 12.5 meters instead of 6.25 meters, every second electronic module in the seismic cable is removed and the sections are joined directly via connector plugs. The summation of hydrophone groups two by two follows automatically, either by means of automatic summation in the connector plug as in FIG. 7 or by the use of analog switching units in the electronic module as in FIG. 8. Alternatively, hydrophone groups can also be summed in the connector plug which connects the active sections and transmitted via carrier lines back to the electronic module, for example as shown in FIG. 7, via four carrier lines-for a total of eight single channels summed two by two.

Even though the method in accordance with the present invention is described in connection with and implemented on hydrophone groups in seismic streamers, it is implicit that it can also be used in other kinds of sensor groups which are provided and have to be connected in a similar manner within the scope of the attached claims.

We claim:

1. A method for reconnection and connection of hydrophone sensor groups i a seismic streamer having a plurality of active sections connected with electronic modules via connector plugs, comprising:

connecting together a specific number of hydrophone groups on each side of each electronic module to form a first active section on one side of said electronic module and a second active section on the other side of said electronic module, each active section comprising a forward section and a rearward section, said forward section of said first active section being symmetrical with said rearward section of said second active section, so that the number of hydrophone groups in said forward section and said rearward section on each side of each electronic module is identical; and automatically performing a summation of a set of hydrophone groups in at least one respective first and second active section by connecting said at least one respective active section with another respective active section.

2. A method for reconnection and connection of hydrophone sensor groups in a seismic streamer having a plurality of active sections connected with electronic modules via connector plugs, comprising:

connecting together a specific number of hydrophone groups on each side of each electronic module to form a first active section on one side of said electronic module and a second active section on the other side of said electronic module, each active section comprising a forward section and a rearward section, said forward section of said first active section being symmetrical with said rearward section of said second active section, so that the number of hydrophone groups in said forward section and said rearward section on each side of each electronic module is identical; and automatically performing a summation of a set of hydrophone groups in each of said first and second active sections by connecting said forward section of said first active section to one side of a respective electronic module and connecting said rearward section of said second active section to the other side of said respective electronic module.

3. A method as claimed in claim 1 wherein said automatic summation comprises:

connecting at least one respective first active section with another respective second active section by a connector plug; and automatically performing said summation in said connector plug.

4. The method as claimed in claim 1 and further comprising:

providing analog switching units in each electronic module; and automatically performing said summation by said analog switching units.

5. The method as claimed in claim 2 and further comprising:

providing a plurality of carrier lines corresponding to said number of summed hydrophone groups and connecting said summed hydrophone groups in each respective first and second active section by said carrier lines to a respective electronic module, said carrier lines corresponding to said symmetrical connection of respective forward and rearward sections on each side of each electronic module.

6. The method as claimed in claim 4 and further comprising:

providing a plurality of carrier lines corresponding to said number of summed hydrophone groups and connecting said summed hydrophone groups in each respective first and second active section by said carrier lines to a respective electronic module, said carrier lines corresponding to said symmetrical connection of respective forward and rearward sections on each side of each electronic module.

7. The method as claimed in claim 5 and further comprising:

using respective identical carrier lines in said respective active sections for return of summed hydrophone groups, said respective identical carrier lines being used independently of locations of said respective active sections.

8. The method as claimed in claim 6 and further comprising:

using respective identical carrier lines in said respective active sections for return of summed hydrophone groups, said respective identical carrier lines being used independently of locations of said respective active sections.

9. The method as claimed in claim 1 and further comprising:

using hydrophone groups having a short group length of 6.25 meters in said respective active sections.

10. The method as claimed in claim 2 and further comprising:

using hydrophone groups having a short group length of 6.25 meters in said first and second active sections.

11. The method as claimed in claim 3 and further comprising:

using hydrophone groups having a short group length of 6.25 meters in said respective active sections.

12. The method as claimed in claim 8 and further comprising:

using hydrophone groups having a short group length of 6.25 meters in said respective active sections.

13. The method as claimed in claim 1 and further comprising:

using hydrophone groups having a group length of 12.5 meters in said respective active sections.

14. The method as claimed in claim 2 and further comprising:

using hydrophone groups having a group length of 12.5 meters in said respective active sections.

15. The method as claimed in claim 8 and further comprising:

using hydrophone groups having a group length of 12.5 meters in said respective active sections.

* * * * *